United States Patent
Nam et al.

(10) Patent No.: US 10,763,464 B2
(45) Date of Patent: Sep. 1, 2020

(54) CYLINDRICAL BATTERY CELL INCLUDING CAN MADE OF DIFFERENT KINDS OF METALS

(71) Applicant: LG CHEM, LTD., Seoul-si (KR)

(72) Inventors: Kyung Ho Nam, Daejeon (KR); Sang Uck Kim, Daejeon (KR); Byung Hun Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 43 days.

(21) Appl. No.: 15/963,690

(22) Filed: Apr. 26, 2018

(65) Prior Publication Data

US 2018/0315964 A1    Nov. 1, 2018

(30) Foreign Application Priority Data

Apr. 27, 2017    (KR) .................. 10-2017-0054274

(51) Int. Cl.
*H01M 2/02* (2006.01)
*H01M 10/04* (2006.01)
*H01M 10/0587* (2010.01)

(52) U.S. Cl.
CPC ......... *H01M 2/0287* (2013.01); *H01M 2/022* (2013.01); *H01M 2/026* (2013.01); *H01M 2/0225* (2013.01); *H01M 2/0272* (2013.01); *H01M 2/0285* (2013.01); *H01M 10/0422* (2013.01); *H01M 10/0431* (2013.01); *H01M 10/0587* (2013.01); *H01M 2002/0297* (2013.01); *H01M 2220/30* (2013.01)

(58) Field of Classification Search
CPC .... H01M 2/0287; H01M 2/022; H01M 2/026; H01M 10/0422; H01M 10/0431; H01M 2002/0297
See application file for complete search history.

(56) References Cited

U.S. PATENT DOCUMENTS

6,165,640 A * 12/2000 Sugikawa ............. B21D 22/21
429/166
2009/0269661 A1* 10/2009 Mori ................... H01M 2/0202
429/166
2012/0009464 A1    1/2012 Nakazawa et al.

FOREIGN PATENT DOCUMENTS

| JP | H09-008362 | * | 8/1998 | ............. H01M 10/40 |
|---|---|---|---|---|
| KR | 10-2006-0111846 A | | 10/2006 | |
| KR | 10-2009-0129621 A | | 12/2009 | |
| KR | 10-2011-0131250 A | | 12/2011 | |
| KR | 10-2015-0050154 A | | 5/2015 | |

* cited by examiner

*Primary Examiner* — Osei K Amponsah
(74) *Attorney, Agent, or Firm* — Morgan, Lewis & Bockius LLP

(57) ABSTRACT

Disclosed herein is a cylindrical battery cell configured such that an electrode assembly, having a structure in which a positive electrode and a negative electrode are wound in the state in which a separator is interposed between the positive electrode and the negative electrode, is mounted in a cylindrical can in the state of being impregnated with an electrolytic solution, wherein an inner layer and an outer layer, each of which is made of stainless steel, are formed in at least a portion of the cylindrical can, and wherein a reinforcement layer is interposed between the inner layer and the outer layer, the reinforcement layer being made of a different metal than the inner layer and the outer layer.

16 Claims, 9 Drawing Sheets

[FIG. 1]
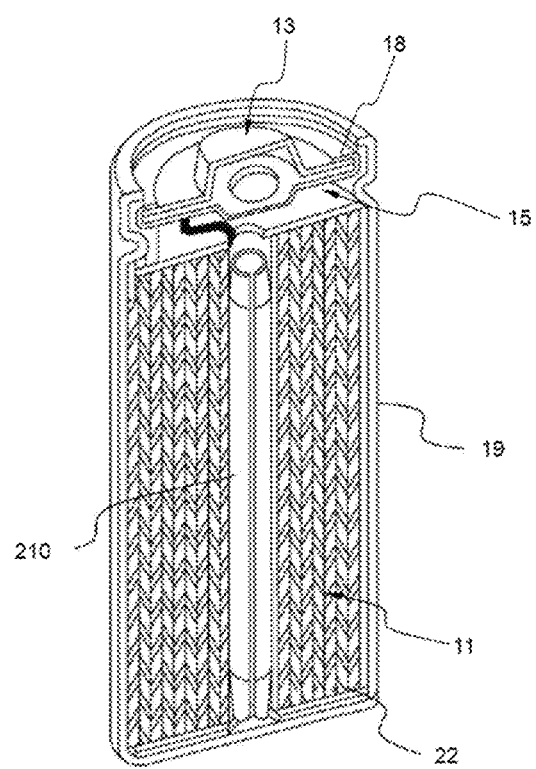

[FIG. 2]
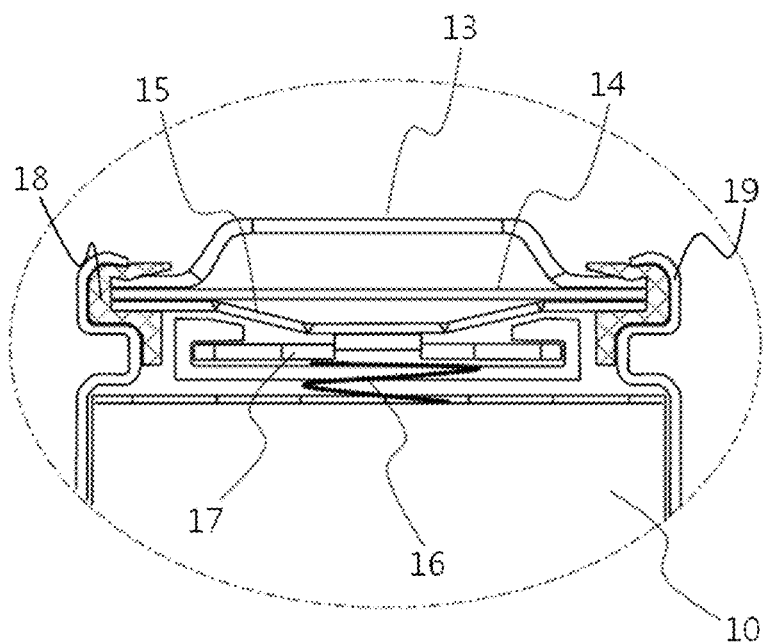

[FIG. 3]
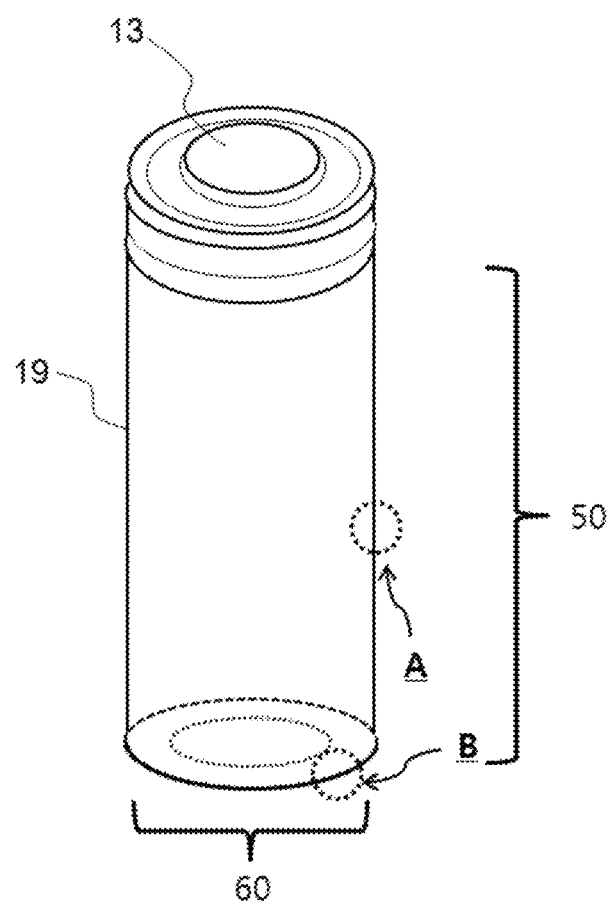

[FIG. 4]
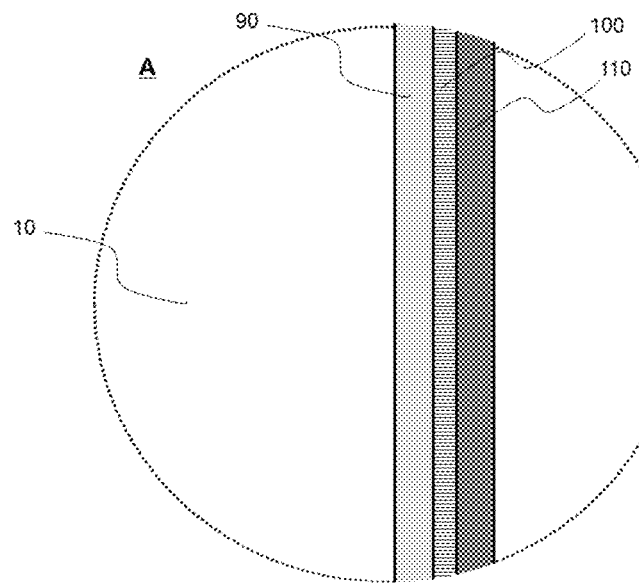
[FIG. 5]
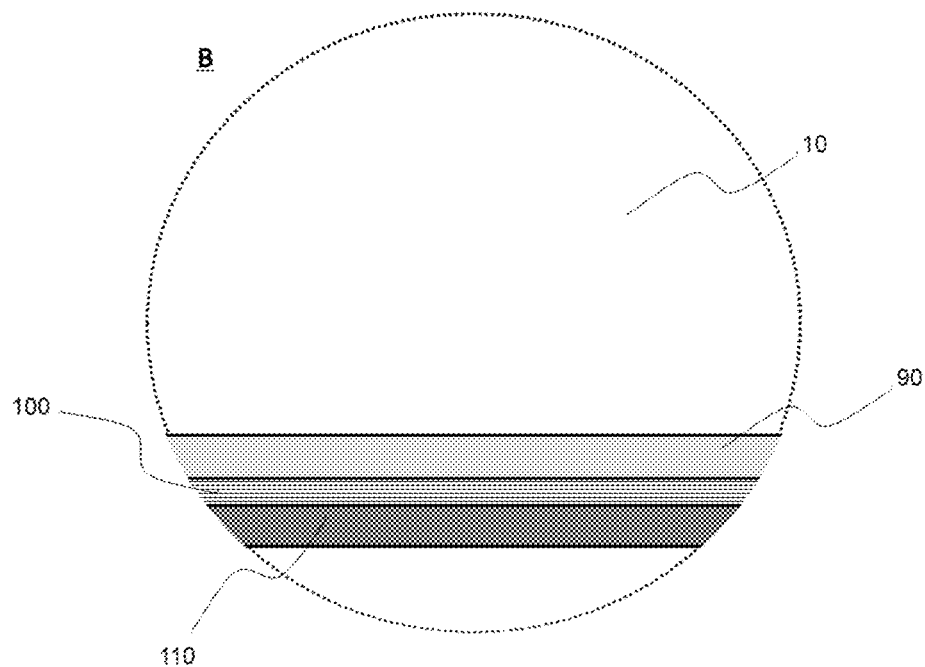

[FIG. 6]
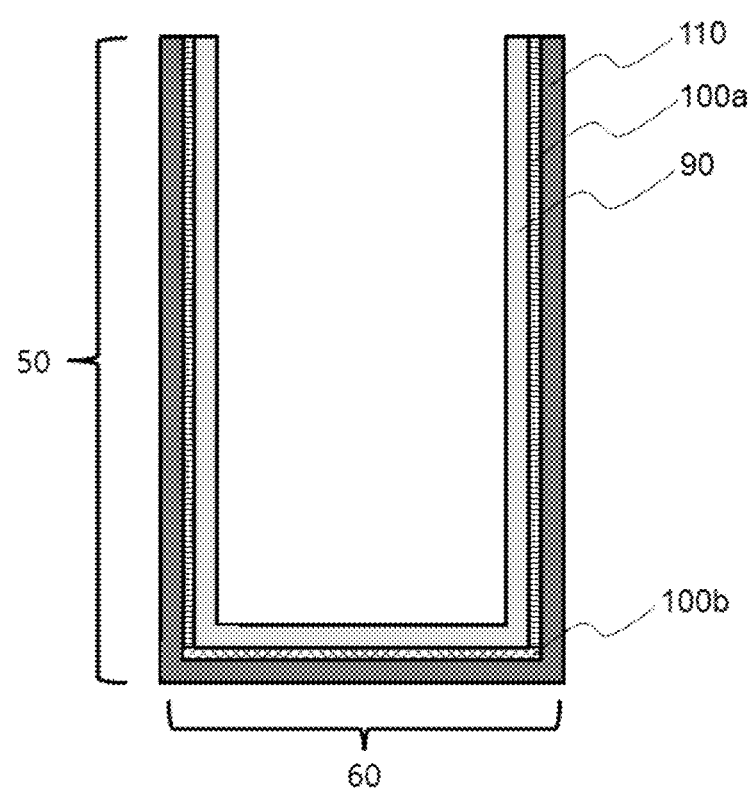

[FIG. 7]
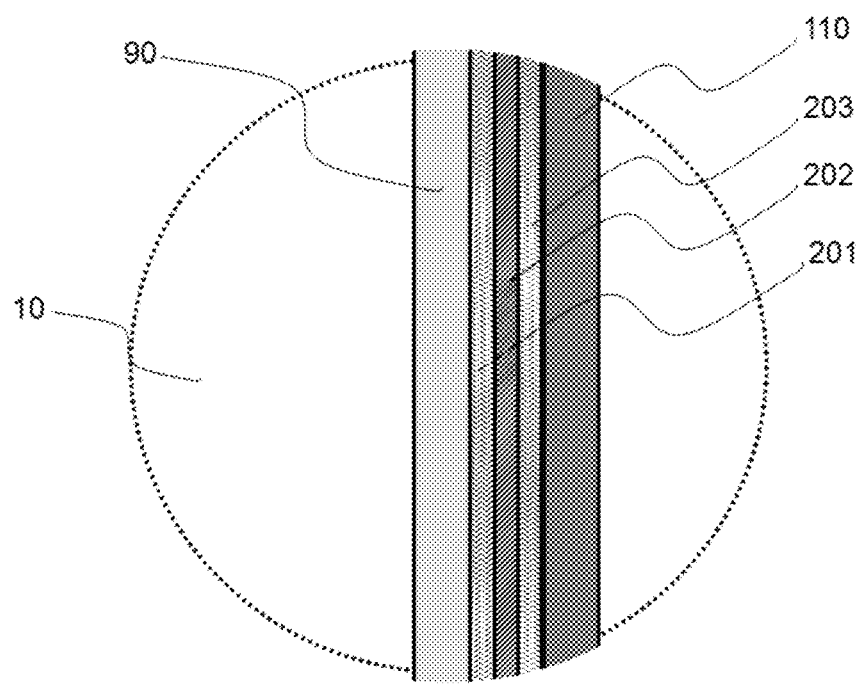

[FIG. 8]
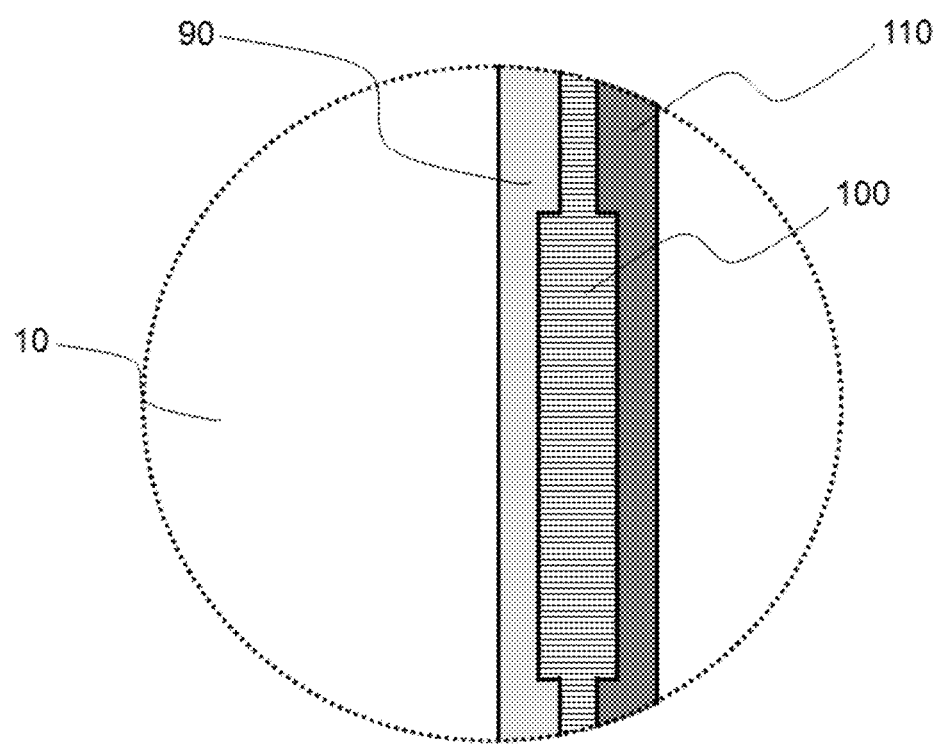

[FIG. 9]
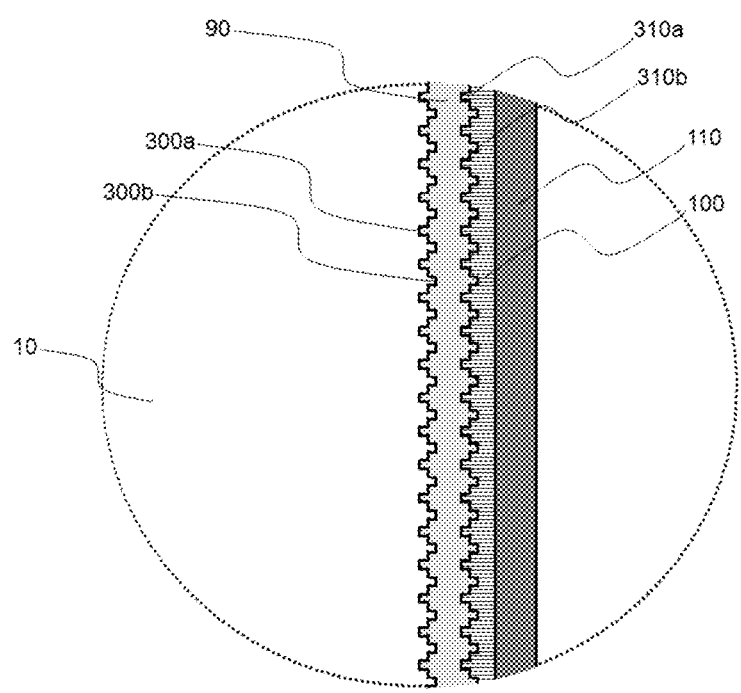

[FIG.10]
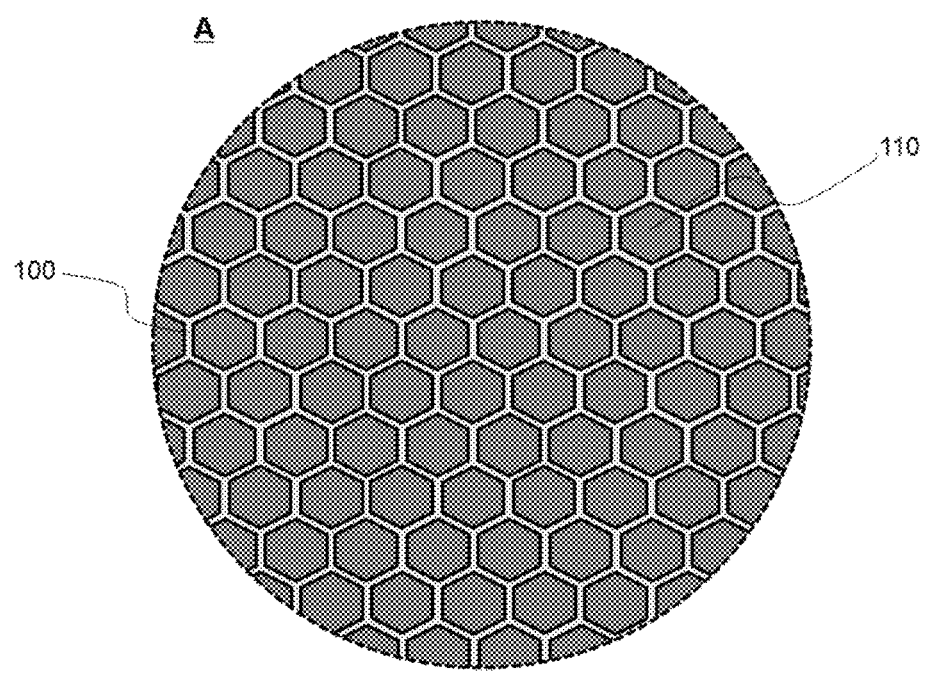

CYLINDRICAL BATTERY CELL INCLUDING CAN MADE OF DIFFERENT KINDS OF METALS

BACKGROUND

Technical Field

The present invention relates to a cylindrical battery cell including a can made of different kinds of metals.

Discussion of the Related Art

As energy prices are increasing due to the depletion of fossil fuels and increasing attention is being paid to environmental pollution, the demand for environmentally friendly alternative energy sources is bound to play an increasing role in the future. Thus, research into techniques for generating various kinds of power, such as nuclear energy, solar energy, wind energy, and tidal power, is underway, and power storage apparatuses for more efficient use of such generated energy are also drawing a lot of attention.

In particular, demand for secondary batteries as energy sources is rapidly increasing as mobile device technology continues to develop and the demand for such mobile devices continues to increase. Accordingly, a lot of research on batteries satisfying various needs has been carried out.

In general, a secondary battery is a battery that can be charged and discharged, unlike a primary battery, which is not chargeable. Secondary batteries are widely used in electronic devices, such as mobile phones, camcorders, and laptop computers, as well as electric vehicles. In particular, a lithium secondary battery has a capacity three or more times greater than the capacity of a nickel cadmium battery or a nickel hydride battery, which is widely used as a power source for electronic devices, and exhibits high energy density per unit weight. For these reasons, the lithium secondary battery has come to be increasingly used.

Secondary batteries may be classified based on the structure of an electrode assembly, which has a structure in which a positive electrode and a negative electrode are stacked in the state in which a separator is interposed between the positive electrode and the negative electrode. Typically, the electrode assembly may be configured to have a jelly-roll (wound) type structure in which a long sheet type positive electrode and a long sheet type negative electrode are wound in the state in which a separator is disposed between the positive electrode and the negative electrode or a stacked type structure in which a plurality of positive electrodes and a plurality of negative electrodes, each of which has a predetermined size, are sequentially stacked in the state in which a plurality of separators is disposed respectively between the positive electrodes and the negative electrodes. In recent years, in order to solve problems with the jelly-roll type electrode assembly and the stacked type electrode assembly, there has been developed a stacked/folded type electrode assembly, which is a combination of the jelly roll type electrode assembly and the stacked type electrode assembly, having an improved structure in which a predetermined number of positive electrodes and a predetermined number of negative electrodes are sequentially stacked in the state in which a predetermined number of separators are disposed respectively between the positive electrodes and the negative electrodes to constitute a unit cell, after which a plurality of unit cells is sequentially folded in the state of being placed on a separation film.

Among such electrode assemblies, the jelly-roll type electrode assembly has advantages in that it is easy to manufacture the jelly-roll type electrode assembly and in that the jelly-roll type electrode assembly has high energy density per unit weight. In particular, the jelly-roll type electrode assembly can be easily received in a case of a cylindrical secondary battery. For this reason, the jelly-roll type electrode assembly has come to be widely used.

In addition, secondary batteries may be classified based on the shape of the battery case of each of the secondary batteries into a cylindrical battery, configured to have a structure in which an electrode assembly is mounted in a cylindrical metal can, a prismatic battery, configured to have a structure in which an electrode assembly is mounted in a prismatic metal can, and a pouch-shaped battery, configured to have a structure in which an electrode assembly is mounted in a pouch-shaped case made of a laminated aluminum sheet. Among such batteries, the cylindrical battery has advantages in that the cylindrical battery has a large capacity and in that the cylindrical battery is structurally stable. For these reasons, the cylindrical battery has come to be increasingly used as a result of the rising of a trend toward a reduction in the size, weight, and thickness of electronic devices and the necessity to reduce the weight of a middle- or large-sized battery pack.

FIGS. 1 and 2 show the representative structure of a related art cylindrical secondary battery.

Referring to FIGS. 1 and 2, the cylindrical secondary battery is generally manufactured by inserting a jelly-roll type electrode assembly 10, which functions as a power-generating element, into a metal can 19, injecting an electrolytic solution into the metal can 19, and mounting a cap assembly at the open upper end of the metal can 19.

The electrode assembly 10 is configured to have a structure in which a positive electrode and a negative electrode are wound into a jelly-roll shape in the state in which a separator is interposed between the positive electrode and the negative electrode. To the positive electrode is attached a positive electrode tab 16, which is connected to the cap assembly. To the negative electrode is attached a negative electrode tab (not shown), which is connected to the lower end of the metal can 19.

Specifically, the positive electrode includes a positive electrode current collector, made of a highly conductive metal plate such as one made of aluminum, and positive electrode active material layers coated on opposite surfaces of the positive electrode current collector. Positive electrode non-coated parts, on each of which no positive electrode active material layer is formed, are formed on opposite ends of the positive electrode plate. The positive electrode tab 16, which is generally made of aluminum and which protrudes upwards from the electrode assembly 10 by a predetermined length, is joined to one of the positive electrode non-coated parts. In addition, the negative electrode includes a negative electrode current collector, made of a conductive metal foil, and negative electrode active material layers coated on opposite surfaces of the negative electrode current collector. Negative electrode non-coated parts, on each of which no negative electrode active material layer is formed, are formed on opposite ends of the negative electrode plate. The negative electrode tab, which protrudes downwards from the electrode assembly 10 by a predetermined length, is joined to one of the negative electrode non-coated parts.

The cap assembly includes a top cap plate 13 constituting a positive electrode terminal, a positive temperature coefficient (PTC) element 14 for interrupting electric current through a great increase in battery resistance when the interior temperature of the battery increases, a safety vent 15 for interrupting electric current and/or exhausting gas when the interior pressure of the battery increases, an insulating member 18 for electrically isolating the safety vent 15 from the cap plate 13 excluding a specific portion thereof while sealing the interior of the battery, and a terminal plate 17 connected to the positive electrode tab 16, which is attached to the positive electrode.

The center of the cap plate 13 protrudes upwards such that the cap plate 13 serves as a positive electrode terminal for connection with an external circuit. The cap plate 13 is provided with a plurality of through-holes, through which gas is discharged. The lower end of the safety vent 15 is electrically connected to the electrode assembly 10 via the terminal plate 17 and the positive electrode tab 16.

It is necessary to design such a cylindrical secondary battery having a minimized size while having a maximized capacity in accordance with the recent trend of miniaturization and slimness of electronic devices. As an example thereof, attempts have been made to reduce the thickness of a battery case as much as possible.

If the thickness of the battery case is decreased, however, various problems may occur when the battery is manufactured.

For example, in a process of forming a beading part, a metal sheet constituting the battery case may be recessed inwards, with the result that the thickness of the battery case may be further reduced. As a result, the mechanical strength of the battery case may be remarkably reduced. Depending on the circumstances, the recessed part of the battery case may rupture. In addition, in a process of forming a crimp region, when the upper end of the battery case is bent, the strength of the bent region of the battery case may be reduced. As a result, the external shape of the battery case may be easily deformed by the interior pressure of the battery, whereby the strength of a seal of the battery case may be reduced.

In particular, when external impact or pressure is applied to the cylindrical secondary battery, in which the jelly-roll type electrode assembly is mounted, the shape of the metal can may be deformed, with the result that the negative electrode current collector and the positive electrode current collector, received in the metal can, may come into contact with each other, whereby a short circuit may occur in the cylindrical secondary battery, or the separator located at the core of the electrode assembly may rupture, with the result that short-circuit current is concentrated in a local region. If dissipation of heat to the outside is not easily performed at this time, the amount of heat that is generated is increased due to an increase in the resistance of current, whereby the battery may catch fire or explode.

Since smartphones, laptop computers, etc. have frequently caught fire or exploded in recent years, such problems related to the safety of the secondary battery have become more serious.

Meanwhile, in the case in which the thickness of the cylindrical metal can constituting the battery case is reduced as a result of reducing the thickness of the battery case, processability is reduced, in addition to a reduction in safety.

Specifically, when the negative electrode tab is welded to the metal can, the negative electrode tab is generally welded to the lower plate of the metal can by resistance welding.

Resistance welding is performed by inserting a first welding rod into the core of the electrode assembly such that the first welding rod comes into contact with the negative electrode tab and applying current in the state in which a second welding rod is brought into tight contact with the outer surface of the lower end of the metal can so as to be opposite the first welding rod. In the case in which a plurality of conductors comes into contact with each other, heat is generated due to contact resistance, and welding is performed by the generated heat.

In this case, as the thickness of the lower plate of the metal can is reduced, contact resistance is inevitably reduced, whereby weldability is reduced. As a result, when external impact or pressure is applied to the secondary battery during the operation of the secondary battery, the negative electrode tab may be easily separated from the metal can. That is, poor welding may cause combustion or explosion of the battery.

Therefore, there is an urgent necessity for technology that is capable of securing both the safety and weldability of a battery cell in processes of slimming and miniaturizing a cylindrical secondary battery in order to maximize the capacity of the cylindrical secondary battery.

SUMMARY

Accordingly, embodiments of the present disclosure are directed to a display device that substantially obviates one or more of the problems due to limitations and disadvantages of the related art.

As a result of a variety of extensive and intensive studies and experiments to solve the problems described above, the inventors of the present application have found that, in the case in which a reinforcement layer is interposed between an inner layer and an outer layer formed in a cylindrical can, and the reinforcement layer is made of a different metal than the inner layer and the outer layer, as will be described below, it is possible to secure both safety and weldability of the cylindrical can. The present invention has been completed based on these findings.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a cylindrical battery cell includes an electrode assembly, having a structure in which a positive electrode and a negative electrode are wound in a state in which a separator is interposed between the positive electrode and the negative electrode, mounted in a cylindrical can in a state of being impregnated with an electrolytic solution, wherein an inner layer and an outer layer, each of which is made of stainless steel, are formed in at least a portion of the cylindrical can, and wherein a reinforcement layer is interposed between the inner layer and the outer layer, the reinforcement layer being made of a different metal than the inner layer and the outer layer.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated and constitute a part of this application, illustrate embodiments of the disclosure and together with the description serve to explain various principles. In the drawings:

FIG. 1 is a vertical sectional perspective view schematically showing a related art cylindrical battery cell;

FIG. 2 is a vertical sectional view of FIG. 1;

FIG. 3 is a perspective view showing a cylindrical battery cell including a reinforcement layer according to the present invention;

FIG. 4 is an enlarged sectional view showing a side part of a cylindrical can of FIG. 3;

FIG. 5 is an enlarged sectional view showing a lower end part of the cylindrical can of FIG. 3;

FIG. 6 is a vertical sectional view showing a reinforcement layer according to the present invention, which is made of different kinds of metals;

FIG. 7 is an enlarged view of FIG. 6;

FIG. 8 is an enlarged sectional view showing a side part of a cylindrical can according to an embodiment of the present invention;

FIG. 9 is an enlarged sectional view showing the side part of the cylindrical can according to the embodiment of the present invention; and FIG. 10 is an enlarged front view showing the side part of the cylindrical can according to the embodiment of the present invention.

DETAILED DESCRIPTION

Now, exemplary embodiments of the present invention will be described in detail with reference to the accompanying drawings. It should be noted, however, that the scope of the present invention is not limited by the illustrated embodiments.

FIG. 3 is a perspective view showing a cylindrical battery cell including a reinforcement layer according to the present invention, FIG. 4 is an enlarged sectional view showing a side part of a cylindrical can of FIG. 3, and FIG. 5 is an enlarged sectional view showing a lower end part of the cylindrical can of FIG. 3.

Referring to FIGS. 3 to 5, the cylindrical battery cell according to the present invention is configured to have a structure in which an electrode assembly 10 is mounted in a cylindrical can 19 in the state of being impregnated with an electrolytic solution (not shown). An inner layer 90 and an outer layer 110, each of which is made of stainless steel, are formed in the cylindrical can 19, and a reinforcement layer 100 is interposed between the inner layer 90 and the outer layer 110. The reinforcement layer 100 is made of a different metal than the inner layer 90 and the outer layer 110.

The reinforcement layer 100 is interposed between the inner layer 90 and the outer layer 110 at a side part 50 and a lower end part 60 of the cylindrical can 19. Even though the inner diameter of the metal can 19 is decreased due to the fixed outer diameter of the metal can 19 at the side part 50 of the metal can 19, therefore, the safety of the metal can 19 is improved through the application of the reinforcement layer 100, which is made of a high-strength material, to the side part 50 of the metal can 19.

In addition, even when low-resistance tabs are used, weldability is achieved by the provision of the reinforcement layer 100 that is located at the lower end part 60 of the metal can 19.

FIG. 6 is a vertical sectional view showing a reinforcement layer according to the present invention, which is made of different kinds of metals, and FIG. 7 is an enlarged view of FIG. 6.

Referring to FIGS. 6 and 7, an example of the cylindrical battery cell according to the present invention may be configured such that a structure including an inner layer 90, a reinforcement layer 100, and an outer layer 110 is formed at the side part 50 and the lower end part 60 of the cylindrical can 19 and such that reinforcement layers 100a and 100b, formed respectively at the side part 50 and the lower end part 60 of the cylindrical can 19, are made of different kinds of metals.

Consequently, the reinforcement layer formed at the side part 50 of the cylindrical can 19, which requires an improvement in safety, is made of a high-strength metal, such as tungsten, and the reinforcement layer formed at the lower end part 60 of the cylindrical can 19, which requires an improvement in weldability, is made of a highly conductive metal, such as aluminum, whereby it is possible to secure the safety and processability of the cylindrical battery cell even in the case in which the cylindrical battery cell becomes thinner.

The reinforcement layer may be configured such that different kinds of metals are sequentially stacked (201, 202, and 203) starting from the portion that faces the inner layer 90 of the cylindrical can 19. In an example, the reinforcement layer may be configured such that tungsten, aluminum, and tungsten are sequentially stacked at the side part 50 of the cylindrical can 19 starting from the portion that faces the inner layer 90 of the cylindrical can 19.

Consequently, it is possible to secure both the safety and the weldability of the cylindrical can 19 by designing an optimum reinforcement layer 100 including a plurality of metal layers 201, 202, and 203 depending on a concrete change in the thickness of the side part 50 and the lower end part 60 of the cylindrical can 19.

FIGS. 8 to 10 are enlarged views showing a side part of a cylindrical can according to an embodiment of the present invention.

Referring to FIGS. 8 to 10, the cylindrical battery cell according to the present invention is configured such that the thickness of the reinforcement layer 100 located at the side part 50 of the cylindrical can 19, which has low resistance to external impact or external pressure, particularly at the portion of the side part 50 of the cylindrical can 19 that is located within a range from 30% to 70% of the height of the cylindrical can 19 from the lower end part 60 of the cylindrical can 19, is greater than the thickness of the other portion of the side part 50 of the cylindrical can 19. As a result, the cylindrical battery cell according to the present invention configured as described above exhibits higher safety than a cylindrical battery cell including a reinforcement layer 100 having a uniform thickness.

In addition, micro-scale concave and convex units 300a, 300b, 310a, and 310b are formed on the inner surface of the inner layer 90 of the cylindrical can 19 of the cylindrical battery cell according to the present invention and on one surface of the reinforcement layer 100 that faces the inner layer 90 of the cylindrical can 19.

Specifically, the micro-scale concave and convex unit 300a and 300b, which is formed on the inner surface of the inner layer 90 of the cylindrical can 19, increases contact resistance to a welding rod during resistance welding, thereby maximizing weldability. The micro-scale concave and convex unit 310a and 310b, which is formed on one surface of the reinforcement layer 100 that faces the inner layer 90 of the cylindrical can 19, provides additional joint frictional force to the inner layer 90 of the cylindrical can 19.

In addition, although not shown in the figures, micro-scale concave and convex units may also be formed on one surface of the reinforcement layer 100 that faces the outer layer 110 of the cylindrical can 19 and/or one surface of the outer layer 110 of the cylindrical can 19 that faces the reinforcement layer 100.

In accordance with embodiments described above, objects and advantages may be achieved with a cylindrical battery cell configured such that an electrode assembly, having a structure in which a positive electrode and a negative electrode are wound in the state in which a separator is interposed between the positive electrode and the negative electrode, is mounted in a cylindrical can in the state of being impregnated with an electrolytic solution, wherein an inner layer and an outer layer, each of which is made of stainless steel, are formed in at least a portion of the cylindrical can, and wherein a reinforcement layer is interposed between the inner layer and the outer layer, the reinforcement layer being made of a different metal than the inner layer and the outer layer.

A cylindrical metal can of a cylindrical secondary battery is generally made of stainless steel. In the case in which the thickness of the metal can is reduced as a result of miniaturization and slimness, however, stainless steel may not exhibit sufficient mechanical strength to secure safety. As a result, the battery may be deformed by external impact or pressure. Ultimately, the battery may catch fire or explode.

In contrast, in the cylindrical battery cell according to the present invention, a reinforcement layer, made of a different metal than an inner layer and an outer layer of the cylindrical can, each of which is made of stainless steel, is interposed between the inner layer and the outer layer, whereby it is possible to realize improved mechanical properties against external impact or pressure.

In an example, the reinforcement layer may be made of a metal selected from a group consisting of Mo, Ni, Ga, Cr, Ti, Cu, Te, V, Sb, Al, Mg, W, and Ni or an alloy comprising at least one of the metals.

However, the material for the reinforcement layer is not limited to the above-specified metals or alloys thereof. The material for the reinforcement layer is not particularly restricted, as long as the material for the reinforcement layer is capable of improving mechanical strength or weldability of the cylindrical can.

In an example, however, the reinforcement layer may be made of tungsten (W) or aluminum (Al).

Tungsten exhibits higher mechanical strength than stainless steel, and aluminum exhibits higher electrical conductivity than stainless steel. Consequently, the reinforcement layer formed at a side part or a lower end part of the cylindrical can may be made of the above-specified metal and an alloy thereof.

In an example, the reinforcement layer formed at the side part of the cylindrical can may be formed in a shape selected from the group consisting of a tube shape, a net shape, and a multi-band shape, and the reinforcement layer formed at the lower end part of the cylindrical can may be formed in a shape selected from the group consisting of a circular shape, an oval shape, a prismatic shape, and a net shape.

Meanwhile, in the cylindrical battery cell according to the present invention, the reinforcement layer may be formed between the inner layer and the outer layer, each of which is made of stainless steel, the structure including the inner layer, the reinforcement layer, and the outer layer may be formed at the side part and the lower end part of the cylindrical can, and the reinforcement layers formed respectively at the side part and the lower end part of the cylindrical can may be made of different kinds of metals.

Since the side part of the cylindrical metal can exhibits lower resistance to external impact or pressure than the lower end part of the cylindrical metal can, a metal that is capable of remarkably improving mechanical strength is required. On the other hand, the lower end part of the cylindrical metal can exhibits sufficient mechanical properties; however, a metal that is capable of improving weldability is required in order to prevent a reduction in contact resistance due to the thickness reduction. Preferably, therefore, the reinforcement layers formed respectively at the side part and the lower end part of the cylindrical can are made of different kinds of metals.

In an example, the reinforcement layer formed at the side part of the cylindrical can may be made of tungsten (W), and the reinforcement layer formed at the lower end part of the cylindrical can may be made of aluminum (Al).

Tungsten is superior to stainless steel in terms of strength or hardness at a high temperature as well as normal hardness. For this reason, the reinforcement layer formed at the side part of the cylindrical can is preferably made of tungsten. Aluminum is superior to stainless steel in terms of conductivity, although the hardness of aluminum is lower than the hardness of stainless steel. For this reason, the reinforcement layer formed at the lower end part of the cylindrical can is preferably made of aluminum, since the amount of heat that is required can be sufficiently generated when the negative electrode tab and the lower end part of the metal can are welded to each other by resistance welding.

In an example, the resistance of the reinforcement layer formed at the lower end part of the cylindrical can may be 10% to 70% of the resistance of the inner layer and the outer layer formed at the lower end part of the cylindrical can.

If the resistance of the reinforcement layer is less than 10% of the resistance of the inner layer and the outer layer formed at the lower end part of the cylindrical can or is greater than 70% of the resistance of the inner layer and the outer layer formed at the lower end part of the cylindrical can, it is not possible to acquire the desired effect, which is undesirable.

In an example, the strength of the reinforcement layer formed at the side part of the cylindrical can may be 120% to 200% of the strength of the inner layer and the outer layer formed at the side part of the cylindrical can.

If the strength of the reinforcement layer is less than 120% of the strength of the inner layer and the outer layer formed at the side part of the cylindrical can, it is not possible to sufficiently improve mechanical strength, which is undesirable. If the strength of the reinforcement layer is greater than 200% of the strength of the inner layer and the outer layer formed at the side part of the cylindrical can, processability is lowered even though costs are increased, which is also undesirable.

Meanwhile, in an example, the reinforcement layer may be configured to have a structure in which tungsten (W), aluminum (Al), and tungsten (W) are sequentially stacked starting from the portion that faces the inner layer of the cylindrical can. Alternatively, the reinforcement layer may be configured to have a structure in which aluminum (Al), tungsten (W), and aluminum (Al) are sequentially stacked starting from the portion that faces the inner layer of the cylindrical can.

That is, the reinforcement layer according to the present invention may be made of a single metal or an alloy thereof. Alternatively, the reinforcement layer according to the present invention may be made of two or more kinds of metals or alloys thereof. That is, depending on the thickness of the side part and the lower end part of the cylindrical can, a plurality of metals may be selectively used in order to constitute the reinforcement layer.

In general, the side part of the cylindrical can may have a thickness of 0.15 to 0.25 mm. In an example, in the case in which the side part of the cylindrical can has a relatively small thickness of 0.15 mm, the reinforcement layer may be configured to have a structure in which tungsten, aluminum, and tungsten are sequentially stacked, since it is further necessary to secure safety. On the other hand, in the case in which the side part of the cylindrical can has a relatively large thickness of 0.25 mm, the reinforcement layer may be configured to have a structure in which aluminum, tungsten, and aluminum are sequentially stacked, since it is further necessary to secure conductivity.

In the same manner, the lower end part of the cylindrical can may have a thickness of about 0.3 mm. Different kinds of metals may be used for the reinforcement layer depending on the thickness of the lower end part of the cylindrical can.

In the present invention, therefore, it is possible to provide a cylindrical battery cell including an optimum reinforcement layer made of different kinds of metals depending on the actual thickness of the side part and the lower end part of the cylindrical can, whereby both the safety and weldability of the cylindrical battery cell are secured while the capacity of the cylindrical battery cell is maximized.

In an example, the reinforcement layer may have a thickness of 0.05 mm to 0.2 mm.

If the thickness of the reinforcement layer is less than 0.05 mm, it is not possible to sufficiently improve mechanical properties, despite the use of tungsten or an alloy thereof, which is undesirable. On the other hand, if the thickness of the reinforcement layer is greater than 0.2 mm, processability is lowered and the capacity of the battery is reduced, which is also undesirable.

In an example, the inner layer of the cylindrical can may have a thickness of 0.03 mm to 0.1 mm, and the outer layer of the cylindrical can may have a thickness of 0.05 mm to 0.15 mm.

If the thickness of the inner layer of the cylindrical can deviates from the above-specified range, it is not possible to secure both safety and weldability, even though slimness is achieved through a reduction in the overall thickness of the side part or the lower end part of the metal can, which is undesirable.

In an example, the thickness of the reinforcement layer that is formed within a range from 30% to 70% of the height of the cylindrical can from the lower end part of the cylindrical can may be 20% to 50% greater than the thickness of the other portion of the cylindrical can. In the cylindrical secondary battery, the side part of the cylindrical can, particularly the portion of the side part of the cylindrical can that is located within a range from 30% to 70% of the height of the cylindrical can from the lower end part of the cylindrical can, has the lowest resistance to external impact or external pressure. Consequently, it is possible to maximize the safety of the cylindrical secondary battery by increasing the thickness of the reinforcement layer so as to be larger than the thickness of the other portion of the cylindrical can.

In an example, micro-scale concave and convex units for providing joint frictional force may be formed on the inner surface of the inner layer of the cylindrical can and on one surface of the reinforcement layer that faces the inner layer of the cylindrical can.

Resistance welding is carried out based on the principle by which heat is generated due to contact resistance when a plurality of conductors comes into contact with each other. The higher the contact resistance, the greater the amount of heat generated from the contact parts.

Contact resistance increases as the contact area between the conductors decreases. However, the lower end part of the metal can of the related art cylindrical secondary battery is smooth and flat, with the result that contact resistance is low, whereby weldability is reduced.

In the cylindrical battery cell according to the present invention, the micro-scale concave and convex unit is formed on the inner surface of the inner layer of the cylindrical can, with the result that contact resistance is increased, whereby weldability is maximized.

In addition, the micro-scale concave and convex unit is also formed on one surface of the reinforcement layer that faces the inner layer of the cylindrical can, with the result that the joint frictional force with the inner layer of the cylindrical can is increased, whereby safety is further improved. In order to provide additional joint frictional force, the micro-scale concave and convex units may be formed on surfaces of the outer layer and the reinforcement layer that face each other.

In an example, the micro-scale concave and convex units may be formed through mechanical or chemical surface treatment, and each of the micro-scale concave and convex units may have a size equivalent to 5% to 20% of the thickness of the cylindrical can.

If the size of each of the micro-scale concave and convex units is less than 5% of the thickness of the cylindrical can, weldability and cohesiveness are not sufficiently improved, which is undesirable. On the other hand, if the size of each of the micro-scale concave and convex units is greater than 20% of the thickness of the cylindrical can, the capacity of the secondary battery is reduced, which is also undesirable.

In an example, the inner layer, the reinforcement layer, and the outer layer of the cylindrical battery cell according to the present invention may be coupled to each other through at least one selected from a group consisting of thermal fusion, rolling, chemical bonding, laser welding, spot welding, plating, and coating. Various methods well-known in the art to which the present invention pertains may be used, and the coupling method is not particularly restricted, as long as the coupling method does not impede the purpose of the present invention.

In accordance with the above description, in the cylindrical battery cell according to the present invention, the reinforcement layer, made of a different metal than the inner layer and the outer layer of the cylindrical can, is interposed between the inner layer and the outer layer. Even in the case in which the thickness of the cylindrical can is reduced, therefore, it is possible to exhibit both high safety and weldability.

It will be apparent to those skilled in the art that various modifications and variations can be made in the cylindrical battery cell including a can made of different kinds of metals of the present disclosure without departing from the technical idea or scope of the disclosure. Thus, it is intended that the present disclosure cover the modifications and variations of this disclosure provided they come within the scope of the appended claims and their equivalents.

What is claimed is:

1. A cylindrical battery cell, comprising:
   an electrode assembly, having a structure in which a positive electrode and a negative electrode are wound in a state in which a separator is interposed between the positive electrode and the negative electrode, and mounted in a cylindrical can in a state of being impregnated with an electrolytic solution, wherein an inner layer and an outer layer, each of which consists essentially of stainless steel, are formed in at least a portion of the cylindrical can, wherein a reinforcement layer is interposed between the inner layer and the outer layer, the reinforcement layer being made of a different metal than the inner layer and the outer layer, and wherein the reinforcement layer has a thickness of 0.05 mm to 0.2 mm, the inner layer of the cylindrical can has a thickness of 0.03 mm to 0.1 mm, and the outer layer of the cylindrical can has a thickness of 0.05 mm to 0.15 mm.

2. The cylindrical battery cell according to claim 1, wherein the reinforcement layer is made of a metal selected from a group consisting of Mo, Ni, Ga, Cr, Ti, Cu, Te, V, Sb, Al, Mg, W, and Ni or an alloy comprising at least one of the metals.

3. The cylindrical battery cell according to claim 1, wherein the reinforcement layer is made of tungsten (W) or aluminum (Al).

4. The cylindrical battery cell according to claim 1, wherein
a structure comprising the inner layer, the reinforcement layer, and the outer layer is formed at a side part and a lower end part of the cylindrical can, and
wherein the reinforcement layers formed respectively at the side part and the lower end part of the cylindrical can are made of different kinds of metals.

5. The cylindrical battery cell according to claim 4, wherein the reinforcement layer formed at the side part of the cylindrical can is made of tungsten (W), and wherein the reinforcement layer formed at the lower end part of the cylindrical can is made of aluminum (Al).

6. The cylindrical battery cell according to claim 4, wherein resistance of the reinforcement layer formed at the lower end part of the cylindrical can is 10% to 70% of resistance of the inner layer and the outer layer formed at the lower end part of the cylindrical can.

7. The cylindrical battery cell according to claim 4, wherein strength of the reinforcement layer formed at the side part of the cylindrical can is 120% to 200% of strength of the inner layer and the outer layer formed at the side part of the cylindrical can.

8. The cylindrical battery cell according to claim 1, wherein the reinforcement layer is configured to have a structure in which tungsten (W), aluminum (Al), and tungsten (W) are sequentially stacked starting from a portion that faces the inner layer of the cylindrical can.

9. The cylindrical battery cell according to claim 1, wherein the reinforcement layer is configured to have a structure in which aluminum (Al), tungsten (W), and aluminum (Al) are sequentially stacked starting from a portion that faces the inner layer of the cylindrical can.

10. The cylindrical battery cell according to claim 1, wherein thickness of the reinforcement layer that is formed within a range from 30% to 70% of height of the cylindrical can from the lower end part of the cylindrical can is 20% to 50% greater than thickness of the other portion of the cylindrical can.

11. The cylindrical battery cell according to claim 1, wherein micro-scale concave and convex units for providing joint frictional force are formed on an inner surface of the inner layer of the cylindrical can and on one surface of the reinforcement layer that faces the inner layer of the cylindrical can.

12. The cylindrical battery cell according to claim 11, wherein the micro-scale concave and convex units are formed through mechanical or chemical surface treatment, and wherein each of the micro-scale concave and convex units has a size equivalent to 5% to 20% of thickness of the cylindrical can.

13. The cylindrical battery cell according to claim 1, wherein the inner layer, the reinforcement layer, and the outer layer are coupled to each other through at least one selected from a group consisting of thermal fusion, rolling, chemical bonding, laser welding, spot welding, plating, and coating.

14. A cylindrical battery cell, comprising:
an electrode assembly, having a structure in which a positive electrode and a negative electrode are wound in a state in which a separator is interposed between the positive electrode and the negative electrode, and mounted in a cylindrical can in a state of being impregnated with an electrolytic solution,
wherein an inner layer and an outer layer, each of which is made of stainless steel, are formed in at least a portion of the cylindrical can,
wherein a reinforcement layer is interposed between the inner layer and the outer layer, the reinforcement layer being made of a different metal than the inner layer and the outer layer,
wherein a structure comprising the inner layer, the reinforcement layer, and the outer layer is formed at a side part and a lower end part of the cylindrical can, and
wherein the reinforcement layers formed respectively at the side part and the lower end part of the cylindrical can are made of different kinds of metals.

15. A cylindrical battery cell, comprising:
an electrode assembly, having a structure in which a positive electrode and a negative electrode are wound in a state in which a separator is interposed between the positive electrode and the negative electrode, and mounted in a cylindrical can in a state of being impregnated with an electrolytic solution,
wherein an inner layer and an outer layer, each of which consists essentially of stainless steel, are formed in at least a portion of the cylindrical can,
wherein a reinforcement layer is interposed between the inner layer and the outer layer, the reinforcement layer being made of a different metal than the inner layer and the outer layer,
wherein a structure comprising the inner layer, the reinforcement layer, and the outer layer is formed at a side part and a lower end part of the cylindrical can, and
wherein the reinforcement layers formed respectively at the side part and the lower end part of the cylindrical can are made of different kinds of metals.

16. A cylindrical battery cell, comprising:
an electrode assembly, having a structure in which a positive electrode and a negative electrode are wound in a state in which a separator is interposed between the positive electrode and the negative electrode, and mounted in a cylindrical can in a state of being impregnated with an electrolytic solution,
wherein an inner layer and an outer layer, each of which consists essentially of stainless steel, are formed in at least a portion of the cylindrical can,
wherein a reinforcement layer is interposed between the inner layer and the outer layer, the reinforcement layer being made of a different metal than the inner layer and the outer layer, and
wherein micro-scale concave and convex units for providing joint frictional force are formed on an inner surface of the inner layer of the cylindrical can and on one surface of the reinforcement layer that faces the inner layer of the cylindrical can.

\* \* \* \* \*